(12) United States Patent
Gretz (10) Patent No.: US 6,957,968 B1
(45) Date of Patent: Oct. 25, 2005

(54) SNAP ENGAGEMENT ELECTRICAL FITTING WITH FLANGELESS BODY

(75) Inventor: Thomas J. Gretz, Clarks Summit, PA (US)

(73) Assignee: Arlington Industries, Inc., Scranton, PA (US)

(*) Notice: Subject to any disclaimer, the term of this patent is extended or adjusted under 35 U.S.C. 154(b) by 0 days.

(21) Appl. No.: 10/923,468

(22) Filed: Aug. 20, 2004

Related U.S. Application Data (63) Continuation-in-part of application No. 10/256,641, filed on Sep. 27, 2002, now Pat. No. 6,780,029, which is a continuation-in-part of application No. 10/053,076, filed on Jan. 17, 2002, now Pat. No. 6,709,280.

(51) Int. Cl.[7] .......................................... H01R 13/468
(52) U.S. Cl. ...................................... 439/92; 174/65 R
(58) Field of Search ................................ 174/51, 65 R, 174/153 G; 439/92–96, 108, 101, 609, 939

(56) References Cited

U.S. PATENT DOCUMENTS

| | | | | |
|---|---|---|---|---|
| 2,458,409 A | * | 1/1949 | Paige ........................ | 285/154.1 |
| 3,858,151 A | | 12/1974 | Paskert | |
| 4,012,578 A | | 3/1977 | Moran et al. | |
| 4,123,093 A | * | 10/1978 | Newland ...................... | 285/189 |
| 4,137,602 A | * | 2/1979 | Klumpp, Jr. .................. | 16/2.1 |
| 4,487,462 A | * | 12/1984 | Gale et al. .................... | 439/92 |
| 4,880,387 A | | 11/1989 | Stikeleather et al. | |
| 4,990,721 A | | 2/1991 | Sheehan | |
| 5,094,622 A | * | 3/1992 | Auclair ........................ | 439/92 |
| 5,171,164 A | * | 12/1992 | O'Neil et al. ............... | 439/552 |
| 5,189,779 A | * | 3/1993 | Fishel et al. .................. | 29/453 |
| 5,342,994 A | | 8/1994 | Pratesi | |
| 5,373,106 A | * | 12/1994 | O'Neil et al. ............. | 174/65 R |
| 5,924,877 A | * | 7/1999 | Byrne et al. ................ | 439/101 |
| 6,380,483 B1 | * | 4/2002 | Blake ........................ | 174/65 R |
| 6,380,489 B1 | * | 4/2002 | Gretz ...................... | 174/152 R |
| 6,538,201 B1 | * | 3/2003 | Gretz ........................ | 174/65 G |
| 6,642,451 B1 | * | 11/2003 | Gretz ........................ | 174/65 G |

* cited by examiner

*Primary Examiner*—Tho D. Ta
*Assistant Examiner*—Larisa Tsukerman (57) ABSTRACT

An electrical fitting for snap engagement of electrical cables or conduit to an electrically conductive panel or junction box. The fitting features a flangeless tubular body having a snap ring surrounding its leading end. The tubular body and snap ring are electrically conductive. The snap ring includes one or more projections cantilevered from its outer circumference. The projections include insertion limiting or grounding tabs and wall engagement tangs. The insertion limiting tabs provide extensive surface contact between the fitting and the junction box, thereby improving continuity and lowering the millivolt drop. The wall engagement tangs lock the fitting within the panel or junction box and provide strain relief to prevent easy withdrawal of the fitting therefrom. The snap ring is secured to the leading end of the tubular body by one or more locking tangs extending inwardly from the inner periphery of the snap ring.

8 Claims, 7 Drawing Sheets

SNAP ENGAGEMENT ELECTRICAL FITTING WITH FLANGELESS BODY

This application is a Continuation-In-Part of U.S. patent application Ser. No. 10/256,641 entitled "High Continuity Electrical Fitting", filed Sep. 27, 2002 now U.S. Pat. No. 6,780,029, and still which is a Continuation-In-Part of U.S. application Ser. No. 10/053,076 filed Jan. 17, 2002, U.S. Pat. No. 6,709,280.

FIELD OF THE INVENTION

This invention relates to fittings for connecting electrical cables to a panel and specifically to an improved snap engagement electrical fitting that includes a flangeless tubular body that is mechanically simpler and easier to produce than previous flanged versions of the tubular body.

BACKGROUND OF THE INVENTION

Historically, the most common form of attaching cable and electrical metal tubing (EMT) to electrical junction boxes was by means of an interior-threaded lock nut, which is screwed onto the exterior-threaded electrical fitting that extends into the junction box.

Recently, snap fitting connectors have become popular as a means of connecting cables to electrical junction boxes. One such type of snap fitting is disclosed in U.S. Pat. No. 6,709,280 (hereinafter the '280 patent), filed Jan. 17, 2002 and incorporated herein by reference. The snap fitting improved the functionality of the quick connect fitting by providing a snap ring with a grounding tang of a novel design that provided a tighter fit between the quick connect fitting and the junction box or panel that it connected to. The snap fitting of the '280 patent therefore improved the electrical continuity and lowered the millivolt drop between the fitting, the cable, and the junction box.

An improved snap engagement fitting was disclosed in U.S. patent application Ser. No. 10/256,641 (hereinafter Ser. No. 10/256,641), filed Sep. 27, 2002 and incorporated herein by reference. The fitting of Ser. No. 10/256,641 improved the continuity of the snap engagement fitting by providing a snap ring including a locking tang lanced out of the grounding tang. By lancing the locking tang out of the grounding tang, a greater portion of the outer periphery of the snap ring is available for forming the grounding tang. The larger grounding tangs provide more contact between the junction box and the snap ring thereby providing improved electrical continuity and a lower millivolt drop between the fitting, the cable, and the junction box.

Although the snap engagement fittings of the '280 patent and Ser. No. 10/256,641 vastly improved the electrical continuity of snap engagement fittings constructed of a tubular body and a snap ring, the disclosures required a flange on the tubular body which added to the weight and cost of production of the tubular body. Accordingly, the present invention provides a snap engagement electrical fitting with a flangeless tubular body, which reduces the complexity of the tubular body and makes it easier to produce and therefore lowers the cost of production of the fitting.

These and other advantages will become apparent by reading the attached specification and claims in conjunction with reference to the attached drawings.

SUMMARY OF THE INVENTION

The present invention is an electrical fitting for snap engagement of electrical cables or conduit to an electrically conductive panel or junction box. The fitting features a flangeless tubular body having a snap ring surrounding its leading end. The tubular body and snap ring are electrically conductive. The snap ring includes one or more projections cantilevered from its outer circumference. The projections include insertion limiting or grounding tabs and wall engagement tangs. The insertion limiting tabs provide extensive surface contact between the fitting and the junction box, thereby improving continuity and lowering the millivolt drop. The wall engagement tangs lock the fitting within the panel or junction box and provide strain relief to prevent easy withdrawal of the fitting there from. The snap ring is secured to the leading end of the tubular body by one or more locking tangs extending inwardly from the inner periphery of the snap ring.

INDEX TO REFERENCE NUMERALS IN DRAWINGS 20 snap engagement electrical fitting
22 electrical cable
24 opening
26 wall
30 tubular body
32 tubular shaped snap ring
34 leading end of fitting
36 trailing end of fitting
37 blank
38 U-shaped cutout
40 wall engagement tang
42 slits
44 insertion limiting or grounding tab
46 locking tang
48 leading end of snap ring 50 trailing end of snap ring
52 end of wall engagement tang
54 central axis of snap ring
56 base portion of insertion limiting tab
58 end portion of insertion limiting tab
60 leading end of tubular body
62 trailing end of tubular body
64 depression in tubular body
70 second embodiment of snap engagement electrical fitting
72 tubular body of second embodiment
74 tubular snap ring of second embodiment
76 gap
78 distance
80 outer surface of wall engagement tang
82 central axis of fitting
84 inner periphery of snap ring

DETAILED DESCRIPTION OF THE INVENTION

The present invention comprises an electrically conductive fitting for easy snap engagement of an electrical cable to an electrical panel or electrical junction box. Once connected into a knockout in the panel or junction box, electrical continuity or grounding is provided between the fitting, an inserted cable or conduit, and the panel or junction box. This invention relates to and incorporates herein by reference in its entirety pending U.S. application Ser. No. 10/256,641 filed Sep. 27, 2002 and U.S. Pat. No. 6,709,280 filed Jan. 17, 2002.

Figure 11:
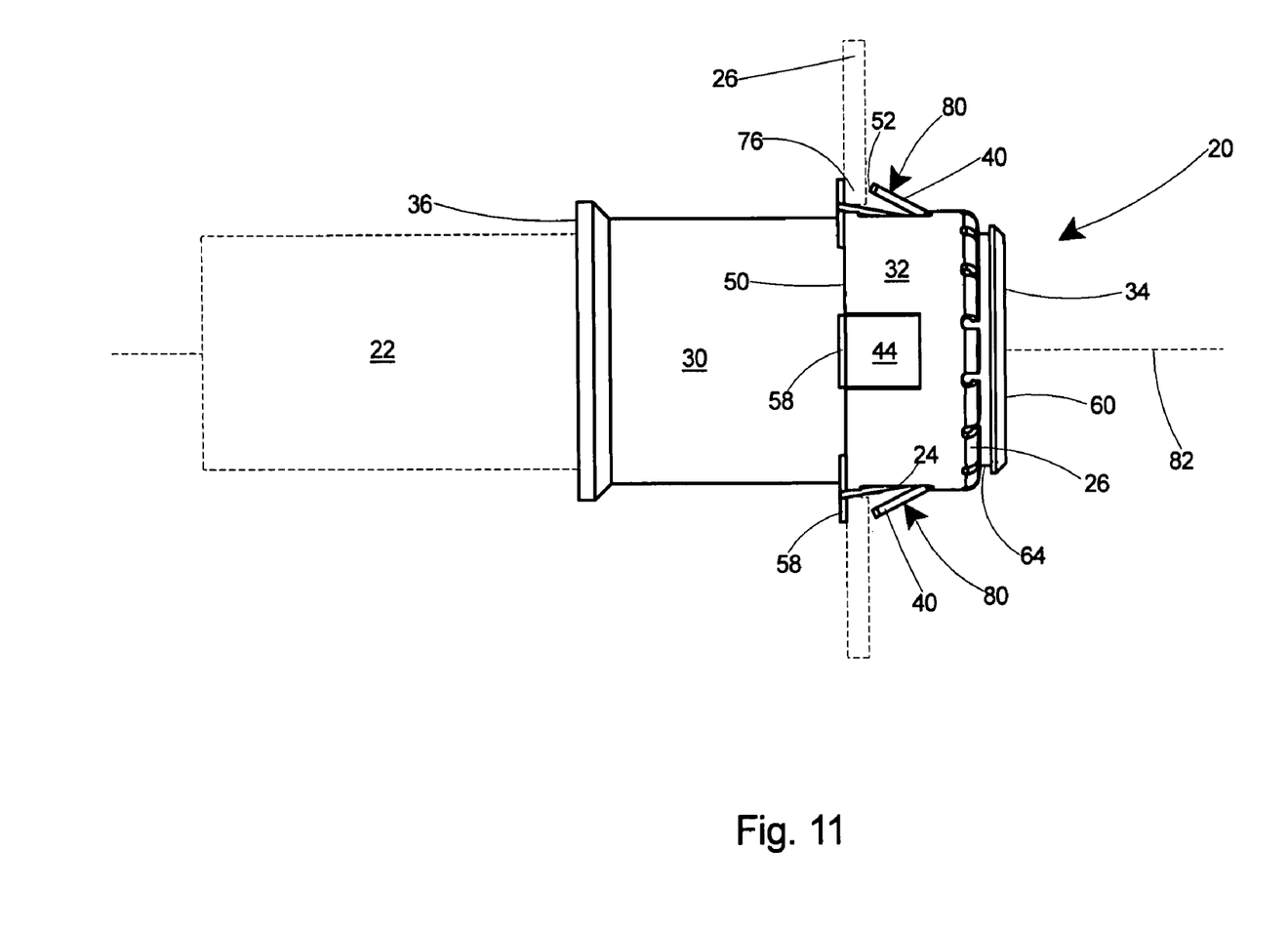
FIG. 11 is a side schematic showing the snap engagement fitting of FIG. 7 inserted into an opening in a panel and with an electrical cable inserted into the trailing end of the fitting.

With reference to FIG. 11, the present invention is a snap engagement electrical fitting 20 for connection of an electrical cable 22 or electrical conduit into an opening 24 in the wall 26 of a panel or junction box (not shown). The snap engagement fitting 20 includes a tubular body 30 and a tubular shaped snap ring 32 surrounding the tubular body 30. The fitting 20 includes a leading end 34 for insertion into the opening 24 in the wall 26 and a trailing end 36 that is capable of receiving an electrical cable 22 or conduit.

Figure 1:
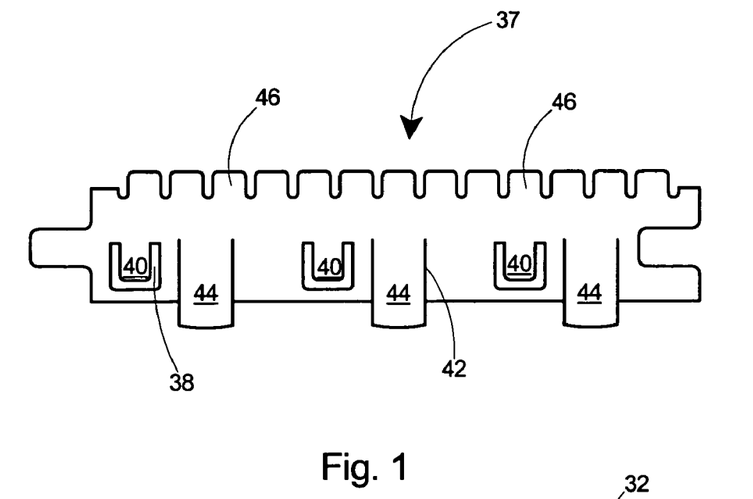
FIG. 1 is a plan view of the preferred embodiment of a blank that has been stamped out and will be formed into the snap ring of the present invention.

Referring to FIG. 1, the snap ring is typically constructed of spring steel and is typically stamped out of a flat sheet of spring steel. The stamped out snap ring is typically referred to as a blank 37 and includes U-shaped cutouts 38 that define wall engagement tangs 40, slits 42 that define insertion limiting or grounding tabs 44, and locking tangs 46 along one edge of the blank 37.

Figure 2:
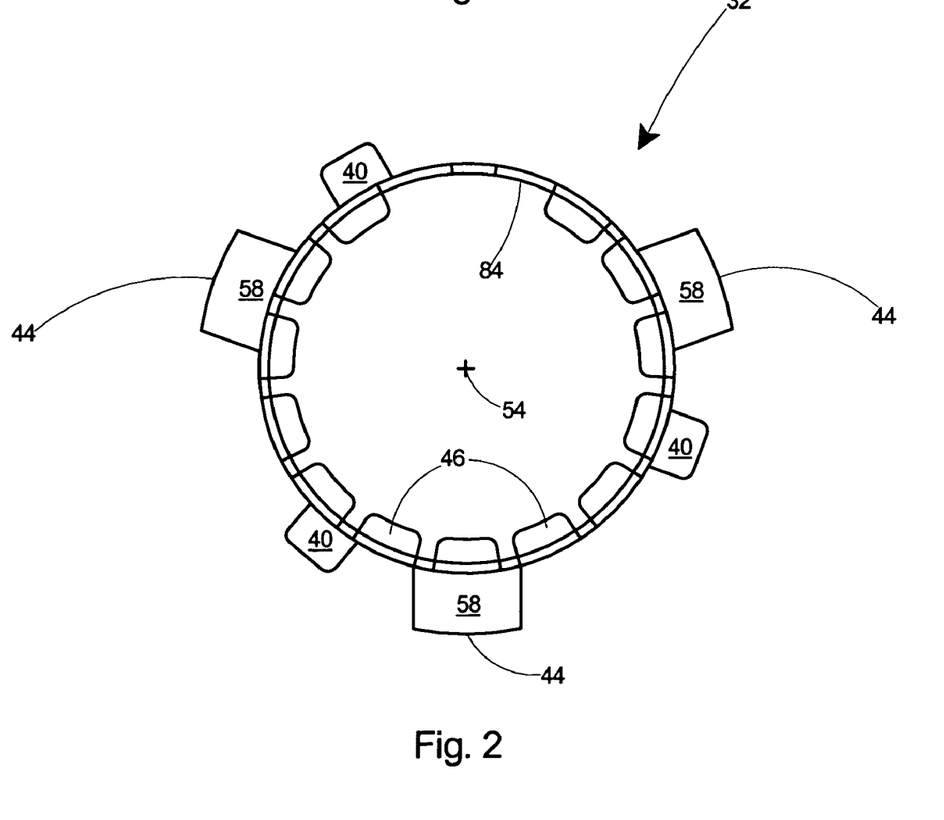
FIG. 2 is a plan view of a snap ring after the blank of FIG. 1 has been formed into a circular shape.
Figure 3:
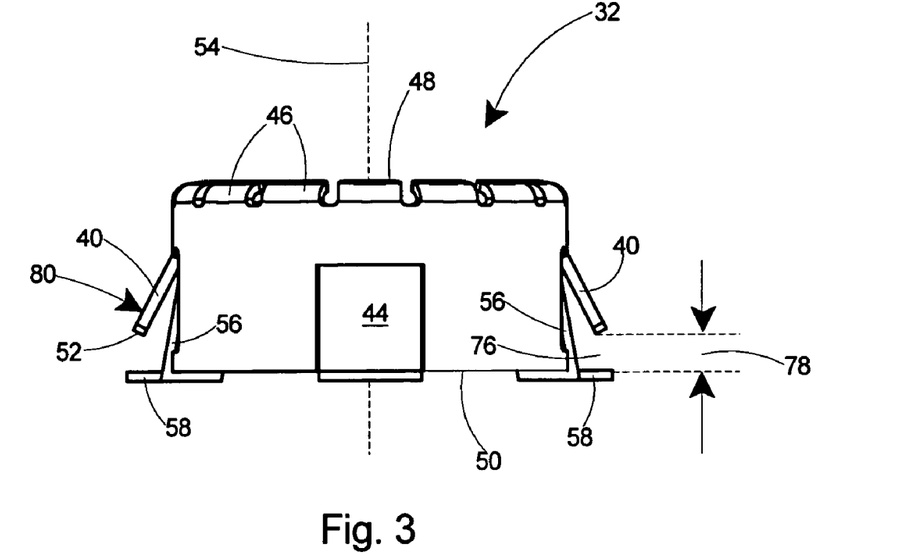
FIG. 3 is a side view of the snap ring of FIG. 2.
Figure 4:
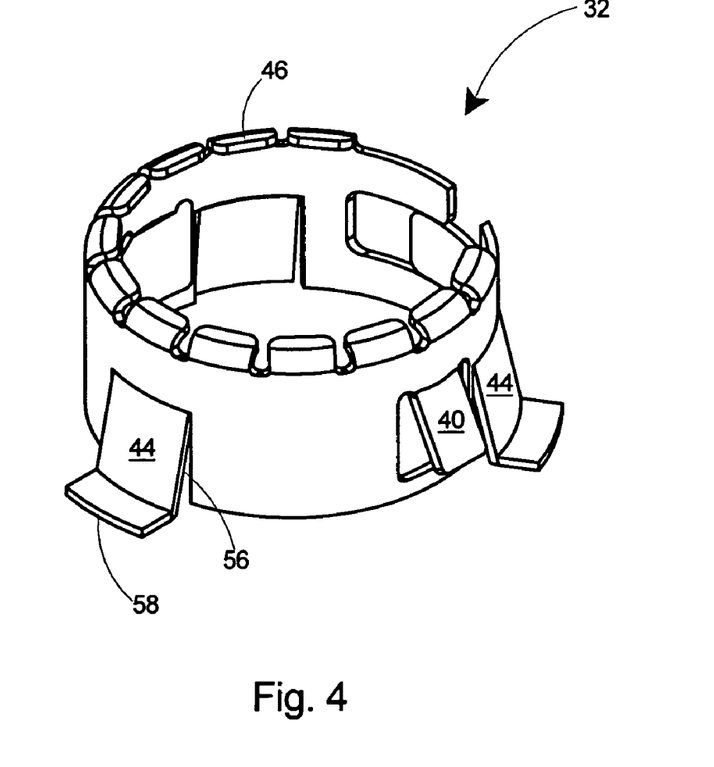
FIG. 4 is a side view of the preferred embodiment of a snap ring according to the present invention.

The blank 37 depicted in FIG. 1 is formed into the tubular shaped snap ring 32 as shown in FIGS. 2–4. As shown in FIG. 3, the tubular snap ring 32 includes a leading 48 and a trailing 50 end. The wall engagement tangs 40 extend outwardly from the snap ring 32 with their ends 52 oriented toward the trailing end 50 of the snap ring 32. The locking tangs 46 extend inwardly from the snap ring 32 toward the central axis 54. Extending outwardly from the snap ring 32 are the insertion limiting tabs 44, which have a base portion 56 integral with and cantilevered from the snap ring 32 and an end portion 58 orthogonal to the central axis 54 of the snap ring 32.

Figure 5:
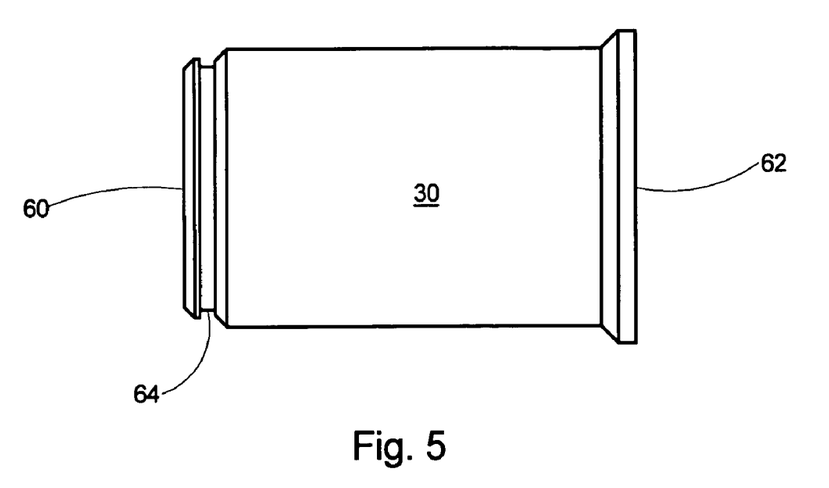
FIG. 5 is a side view of a preferred embodiment of a tubular body that will be used with the snap ring of FIG. 4.
Figure 6:
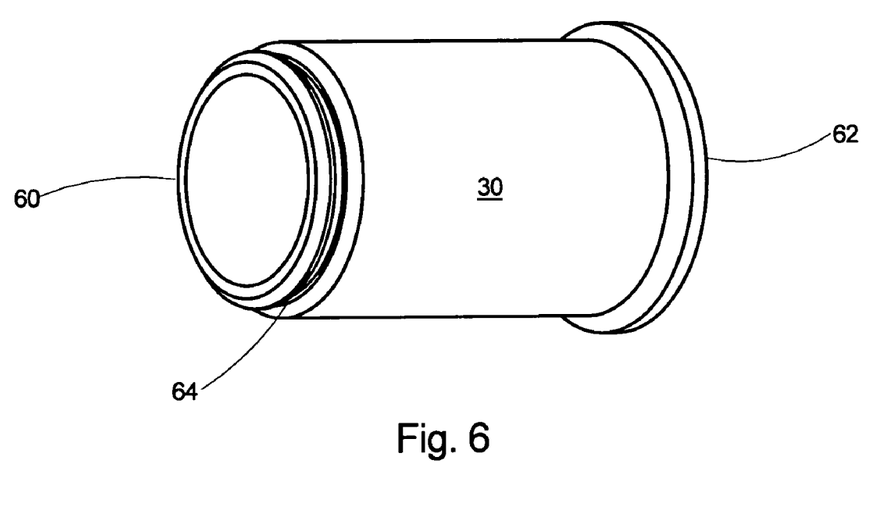
FIG. 6 is a perspective view of the tubular body of FIG. 5.

With reference to FIGS. 5 and 6, the tubular body 30 includes a leading end 60, a trailing end 62, and a depression 64 formed circumferentially around its outer surface. In the preferred embodiment depicted in FIGS. 5 and 6, the depression 64 is located near the leading end 60 of the tubular body 30.

Figure 7:
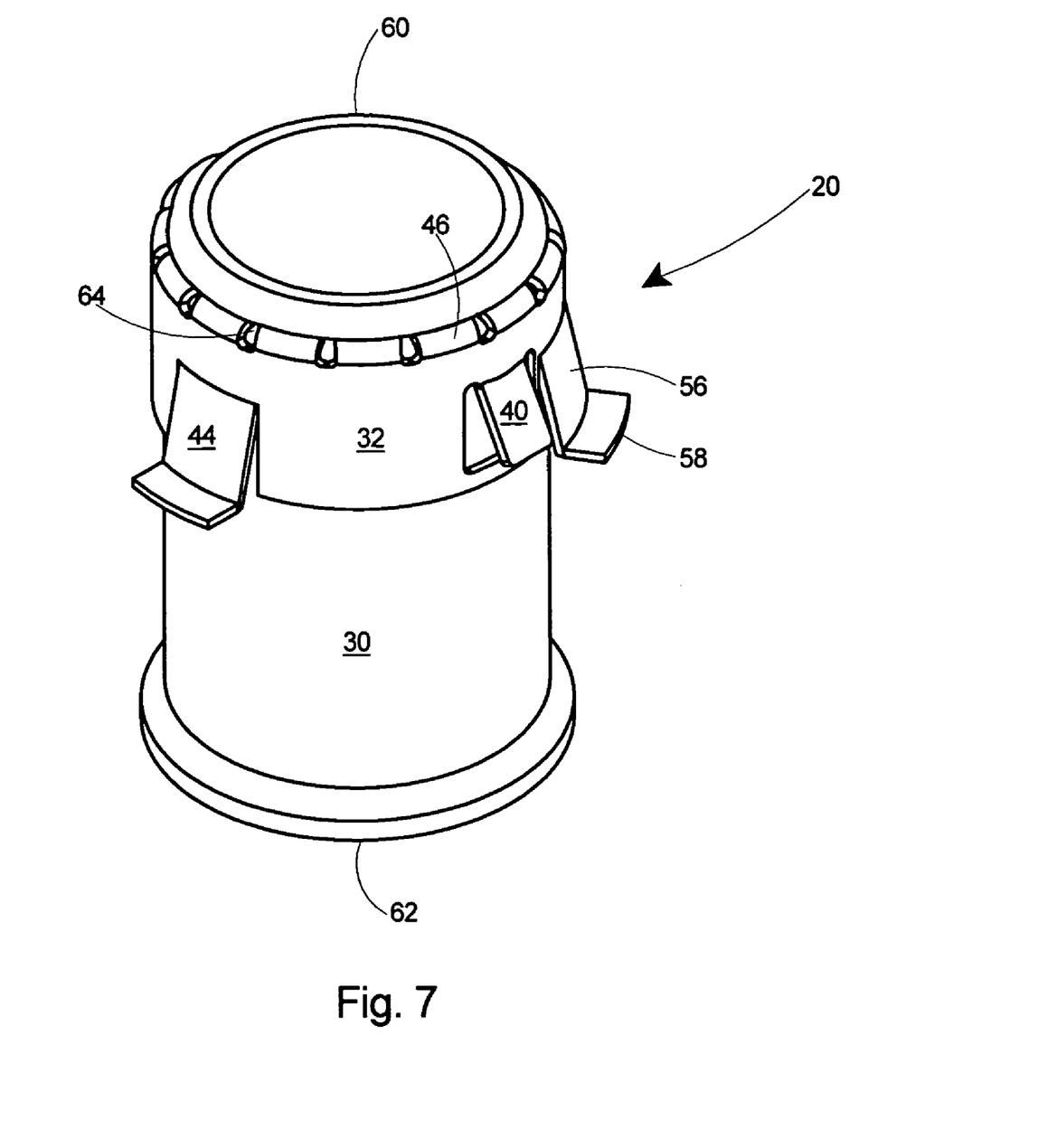
FIG. 7 is a perspective view of the preferred embodiment of a snap engagement electrical fitting according to the present invention.

As shown in FIG. 7, in the assembled fitting 20, the locking tangs 46 of the snap ring 32 are received in the depression 64 of the tubular body 30. The snap ring 32 is formed of spring steel and shaped on a mandrel into its circular shape. The circular snap ring 32 is formed into a discontinuous or split ring having a diameter less than the outer diameter of the tubular body 30. Thus the split or snap ring 32, being constructed of the resilient spring steel, can be spread slightly in diameter and pressed over the leading end 60 of the tubular body 30 until the inward-directed locking tangs 46 snap into the depression 64 in the tubular body 30. The snap engagement electrical fitting 20 therefore consists of the tubular body 30 and tubular shaped snap ring 32 held thereon by the spring pressure of the snap ring 32.

As shown in FIGS. 4–7, the preferred embodiment of the snap engagement electrical fitting 20 (see FIG. 7) includes the depression 64 near the leading end 60 of the tubular body 30 (see FIG. 5) and the locking tangs 46 on the leading end 48 of the snap ring 32 (see FIG. 3). The first and preferred embodiment of the fitting 20 therefore has the locking tangs 46 compressed by spring pressure into a depression 64 near the leading end 60 of the tubular body 30.

Figure 8:
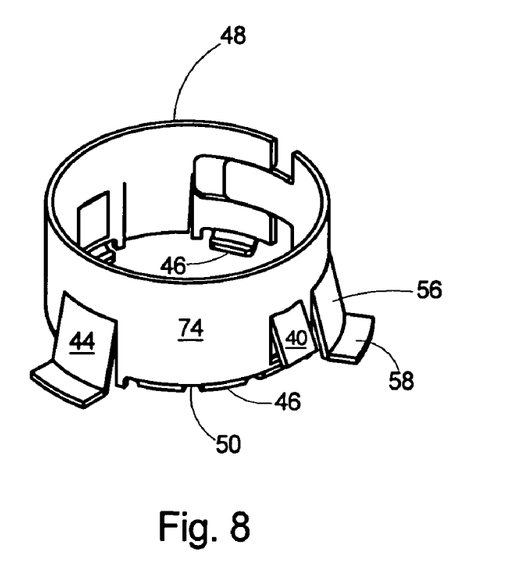
FIG. 8 is a perspective view of a second embodiment of the snap ring according to the present invention.
Figure 9:
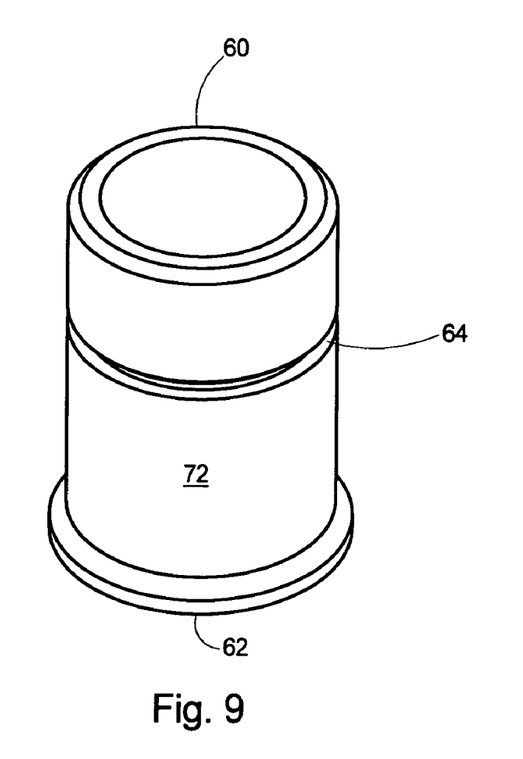
FIG. 9 is a perspective view of a second embodiment of a tubular body that will be used with the snap ring of FIG. 8.
Figure 10:
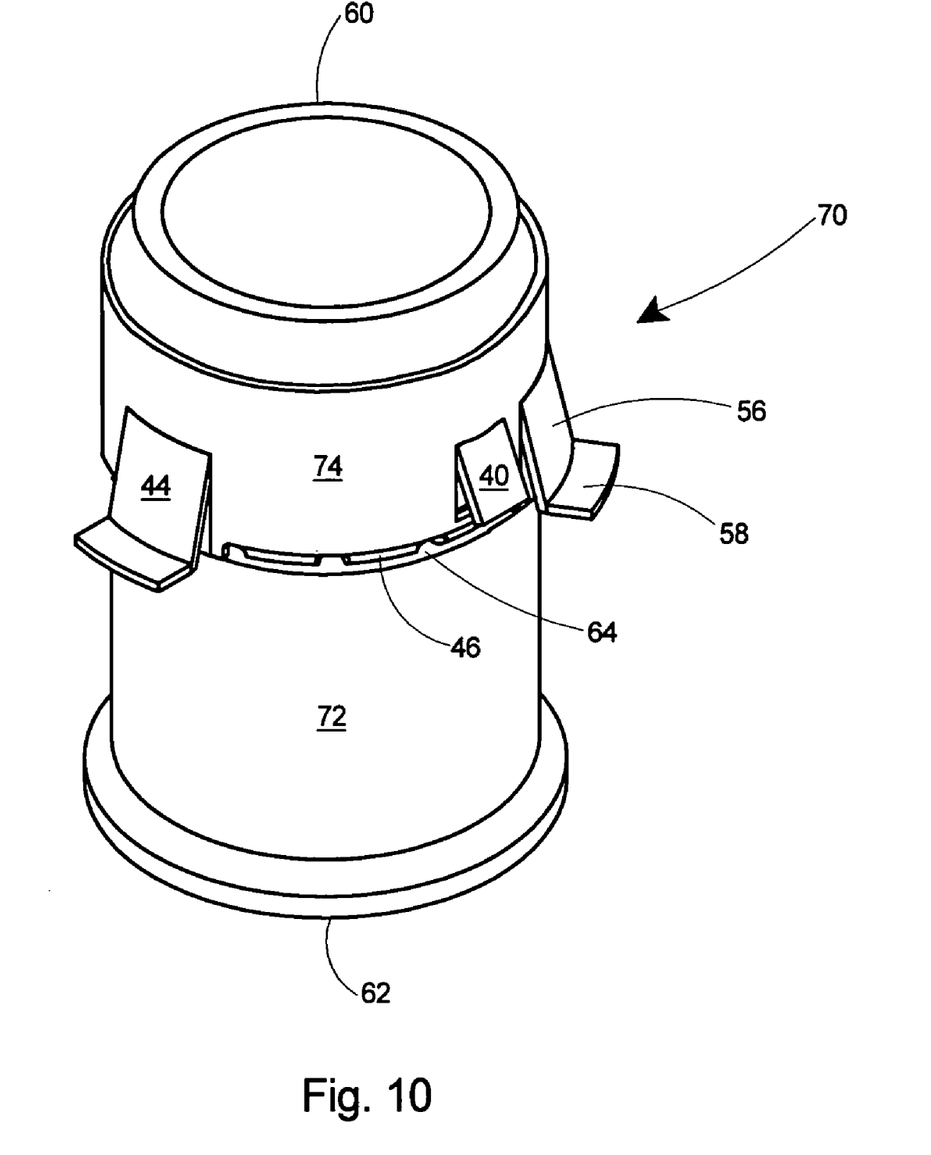
FIG. 10 is a perspective view of a second embodiment of a snap engagement electrical fitting according to the present invention.

A second embodiment 70 of the snap engagement electrical fitting, depicted in FIGS. 8–10, has the depression 64 formed approximately midway longitudinally along the tubular body 72 (see FIG. 9) and the locking tangs 46 formed on the trailing end 50 of the snap ring 74 (see FIG. 8). The assembled electrical fitting 70, shown in FIG. 10, includes the snap ring 74 secured near the leading end 60 of the tubular body 72 but with the depression 64 and inserted locking tangs 46 located proximate the middle of the tubular body 72. Both embodiments of the snap engagement electrical fitting function in a similar manner, with the difference being that, once inserted in a panel, the locking tangs 46 and depression 64 are located inside the panel for the first embodiment 20 (see FIG. 11) of the fitting and outside the panel for the second embodiment 70 of the fitting.

With reference to the side view of the snap ring 32 in FIG. 3, there is a gap 76 defined by the longitudinal distance 78 between the wall engagement tang 40 and the end portion 58 of the insertion limiting tab 44. The distance 78 is critical in that it must be large enough to allow inward flexing of the wall engagement tangs 40 as they are pressed into the opening 24 in the wall 26 of a panel or junction box such as depicted in FIG. 11. The distance 78 must also be small enough such that, once the wall engagement tangs 40 have cleared the wall 26 and snap back to their unbiased positions, there is no excessive distance in the gap 76 to allow excessive longitudinal movement of the fitting 20 with respect to the wall 26. Therefore, excessive longitudinal movement is prevented by sizing the gap 76 correctly. Preferably, the gap 76 is no more than 0.077 inch larger than the thickness of the wall 26.

Reference is directed to FIG. 11 for the operation of a snap engagement fitting according to the present invention. It should be noted that the snap engagement fitting 20 in FIG. 11 is the preferred embodiment of the snap engagement fitting 20, with the depression 64 proximate the leading end 60 of the tubular body 30 and the locking tangs 46 on the leading end 48 of the snap ring 32. The snap ring 32 is secured to the tubular body 30 by spring pressure forcing the locking tangs 46 into the depression 64. The insertion limiting or grounding tabs 44 are for limiting the insertion of the fitting 20 into the opening 24 and for providing electrical continuity or grounding of the fitting 20 to the wall 26 of the panel or electrical box (not shown). The snap ring 32 and tubular body 30 are both preferably constructed of electrically conductive metal, and with the snap ring 32 secured to the tubular body 30 by the strong spring pressure of the snap ring 32, good electrical continuity is established between them.

To install the snap engagement electrical fitting 20 in an opening 24 in a wall 26, an installer simply orients the leading end 34 of the fitting 20 toward the opening 24 and presses the fitting 20 into the opening 24. The outer diameter of the fitting 20 at the leading end 34 and at the snap ring 32 is less than the diameter of the opening 24, therefore the leading end 34 of the fitting 20 and the leading end 48 of the snap ring 32 easily enter the opening 24. As the fitting is advanced by the installer, the perimeter of the wall 26 surrounding the opening 24 contacts the wall engagement tangs 40. Since the wall engagement tangs 40 have their ends 52 oriented toward the trailing end 50 of the snap ring 32, the outer surface 80 of the wall engagement tangs 40 are compressed inwards by the perimeter of the wall 26 at the opening 24. As the fitting 20 is further advanced into the opening 24, the wall engagement tangs 40, as a result of the gap 76 being sized slightly larger than the wall thickness, spring outwards to their unbiased positions as the wall engagement tangs 40 clear the wall 26. At this point the fitting 20 is securely locked into the opening 24 and a strong strain relief is provided by the wall engagement tangs 40 thereby preventing the fitting 20 from being easily withdrawn from the wall 26. Fittings are required by the electrical code to withstand a rearward strain so that wiring from the installed cable 22 is not pulled free from their connections inside the wall 26. Additionally, forward travel of the fitting 20 into the wall is limited by the insertion limiting tabs 44, the end portions 58 of which are orthogonal to the central axis 82 of the fitting 20 and therefore limit the insertion of the fitting 20 into the opening 24.

As shown in FIG. 3, the base portion 56 of the insertion limiting tabs 44 in their unbiased state extend beyond the outer diameter of the snap ring 32. Openings 24 or knockouts in electrical panels and junction boxes conform to standard sizes. For a given size of snap ring 32 such as shown in FIG. 3, the base portion 56 is formed to extend beyond the diameter of the standard size opening it will be used in. With the fitting 20 installed in the opening 24, as shown in FIG. 11, the base portion 56 of the insertion limiting tab 44 is therefore compressed by the wall 26 perimeter at the opening 24 and thereby held in good surface contact with the wall 26. As the snap ring 32 and tubular body 30 are already in close contact, by snapping the snap engagement electrical fitting 20 into the opening 24, good electrical continuity is established between the fitting 20, the panel or electrical box, and any inserted electrical cable 22 or conduit having a conductive surface.

With reference to FIG. 1, there is shown a plan view of the blank 37 used to form the snap ring 32. The blank 37 is typically stamped from a thin piece of spring steel, such as 1050 spring steel or equivalent, preferably between 0.015 and 0.025 inch in thickness, and includes a zinc plating layer of no less than 0.00015 inch thick.

With reference to FIGS. 5 and 6, the tubular body 30 would typically be constructed of zinc, or a similar metal to enable the body 30 to establish good electrical continuity between a metallic cable or conduit (not shown) and the snap ring. The tubular body 30 is typically die cast from zinc or similar metals used in die castings, such as aluminum and magnesium. The most preferred material of construction of the tubular body 30 is zinc.

As shown in FIG. 2, the most preferred arrangement of the snap ring 32 includes three insertion limiting tabs 44, three wall engagement tangs 40, and a plurality of inward directed locking tangs 46. The snap ring 32 includes an inner periphery 84 and preferably the locking tangs 46 extend around at least 50% of the inner periphery and more preferably at least 75% of the inner periphery. Although this is the preferred arrangement it should be obvious by the above discussion and descriptions herein that other arrangements are also possible, and the claimed invention should not limited by the examples shown and given herein.

As shown in FIG. 11, an electrical cable 22 or electrical conduit can be secured to the trailing end 36 of the fitting 20 by any of several means such as the threaded screw hole (68) and receiving screw disclosed in U.S. Pat. No. 6,596,939, the spring steel locking ring (20) disclosed in U.S. Pat. No. 6,080,933, or the cylindrical-shaped split ring (24) of U.S. Pat. No. 6,670,553, all of which are incorporated herein by reference.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A two-piece snap engagement electrical fitting for connection of electrical cables or conduit into an opening in the wall of a panel or junction box comprising:
   a first piece including a tubular body having a leading end and a trailing end with said trailing end capable of receiving an electrical cable or conduit;
   a second piece including a tubular shaped snap ring surrounding said tubular body, said snap ring having a leading and a trailing end;
   said snap ring a split ring having one or more wall engagement tangs extending outwardly therefrom;
   one or more locking tangs extending inwardly from said second piece;
   one or more insertion limiting tabs extending outwardly from said snap ring, said tabs for limiting the insertion of said fitting into said opening and for grounding said fitting to said wall;
   a depression in said first piece for receiving said locking tangs of said second piece;
   said snap ring secured to said tubular body by said locking tangs extending into said depression; and
   a gap between said wall engagement tangs and said insertion limiting tabs to accommodate the thickness of said wall, to lock said fitting to said wall, and prevent said fitting from being inserted beyond said insertion limiting tabs.

2. The snap engagement fitting of claim 1 wherein said tubular body is electrically conductive.

3. The snap engagement fitting of claim 1 wherein
   said depression is at the leading end of said connector; and
   said locking tangs are at the leading end of said snap ring.

4. The snap engagement fitting of claim 1 wherein
   said depression is between said leading and trailing ends of said connector; and
   said locking tangs are at the trailing end of said snap ring.

5. The snap engagement fitting of claim 1 wherein said wall engagement tangs are three in number.

6. The snap engagement fitting of claim 1 wherein said insertion limiting tabs are three in number.

7. The snap engagement fitting of claim 1 wherein
said snap ring includes an inner periphery; and
said locking tangs extend around at least 50% of said inner periphery.

8. A method for snap engagement of a two-piece electrical fitting to an opening in a wall consisting of the steps of:
providing first piece including a tubular body having a trailing end for receiving an electrical cable or conduit;
providing second piece including a tubular shaped snap ring surrounding said connector, said snap ring a split ring having a leading and a trailing end;
providing one or more wall engagement tangs extending outwardly from said snap ring;
providing one or more locking tangs extending inwardly from said snap ring;
providing one or more insertion limiting tabs extending outwardly from said snap ring, said tabs for limiting the insertion of said fitting into said opening and for grounding said fitting to said panel or junction box;
providing a depression in said connector for receiving said locking tangs;
securing said second piece snap ring to said first piece tubular body by snapping said locking tangs into said depression;
providing a gap between said wall engagement tangs and said insertion limiting tabs; and
pressing said fitting into said opening until said wall engagement tangs snap clear of said wall and said insertion limiting tabs contact said wall.

* * * * *